(12) United States Patent
Park et al.

(10) Patent No.: US 9,894,111 B2
(45) Date of Patent: Feb. 13, 2018

(54) SYSTEM AND METHOD FOR DATA TRANSFER BETWEEN TERMINALS IN VOICE COMMUNICATION UNDER VOICE OVER INTERNET PROTOCOL (VOIP)

(71) Applicant: KT Corporation, Seongnam-si,, Gyeonggi-do (KR)

(72) Inventors: Jeong-Tae Park, Seoul (KR); Ki-Ju Yoo, Gyeonggi-do (KR); Sang-Joon Park, Gyeonggi-do (KR); Yoon-Young Park, Gyeonggi-do (KR); Neung-Je Kang, Gyeonggi-do (KR); Hyun-Sam Shin, Seoul (KR); Soo-Jin Choi, Seoul (KR)

(73) Assignee: KT Corporation, Seongnam (KR)

( * ) Notice: Subject to any disclaimer, the term of this patent is extended or adjusted under 35 U.S.C. 154(b) by 0 days.

(21) Appl. No.: 15/080,308

(22) Filed: Mar. 24, 2016

(65) Prior Publication Data

US 2016/0234262 A1 Aug. 11, 2016

Related U.S. Application Data

(63) Continuation of application No. 12/040,844, filed on Feb. 29, 2008, now Pat. No. 9,313,081, which is a
(Continued)

(30) Foreign Application Priority Data

Aug. 30, 2005 (KR) ........................ 10-2005-0079920

(51) Int. Cl.
*H04L 29/06* (2006.01)
*H04M 7/00* (2006.01)
*H04M 3/56* (2006.01)

(52) U.S. Cl.
CPC .... *H04L 65/1083* (2013.01); *H04L 29/06027* (2013.01); *H04L 65/1069* (2013.01);
(Continued)

(58) Field of Classification Search
CPC ........... H04L 29/06027; H04L 65/1069; H04L 65/4007
See application file for complete search history.

(56) References Cited

U.S. PATENT DOCUMENTS 6,343,313 B1    1/2002  Salesky et al.
6,741,586 B1 *  5/2004  Schuster ................... G06F 3/14
                                                     370/352

(Continued)

OTHER PUBLICATIONS

Aljaz, et al.; Supplementary Services in Telecommunication Next Generation Networks, Network Operations, and Management Symposium, 2004, NOMS 2004, IEEE/IFI P. Seoul Korea, Apr. 19-23, 2004, IEEE, vol. 2, Apr. 19, 2004, pp. 159-172.
(Continued)

*Primary Examiner* — Khaled Kassim
*Assistant Examiner* — Syed S Ali
(74) *Attorney, Agent, or Firm* — Sughrue Mion, PLLC

(57) ABSTRACT

The present invention relates to a system and method for sharing and controlling various contents in a voice call. A contents sharing system includes a soft switch and a contents share server. The soft switch receives a voice call from a VoIP terminal to set establishment and cancellation on a voice call session, receives a contents sharing request call, and transmits the same to the contents share server. The contents share server in cooperation with the soft switch receives the contents request call and processes establishment and cancellation on a data session for contents sharing between the callers. Accordingly, improved calling is provided by sharing various contents between the callers in a
(Continued)

voice calling and thereby overcoming the problem of communication only available for voice.

3 Claims, 4 Drawing Sheets

Related U.S. Application Data continuation of application No. PCT/KR2006/002546, filed on Jun. 30, 2006.

(52) U.S. Cl.
CPC ........ *H04L 65/4007* (2013.01); *H04M 7/006* (2013.01); *H04M 3/567* (2013.01)

(56) References Cited

U.S. PATENT DOCUMENTS

| | | |
|---|---|---|
| 6,865,266 B1 | 3/2005 | Pershan |
| 2002/0114282 A1* | 8/2002 | MeLampy ........ H04L 29/06027 370/238 |
| 2002/0156900 A1* | 10/2002 | Marquette ............... H04L 29/06 709/227 |
| 2004/0174860 A1 | 9/2004 | Van Hammond et al. |
| 2004/0223606 A1 | 11/2004 | Enete et al. |
| 2004/0260839 A1 | 12/2004 | Onoda et al. |
| 2005/0018657 A1 | 1/2005 | Nakao et al. |
| 2005/0025182 A1* | 2/2005 | Nazari ................. H04W 88/06 370/469 |
| 2006/0031558 A1* | 2/2006 | Ortega .............. H04L 29/06027 709/232 |
| 2006/0239249 A1* | 10/2006 | Banner ............. H04L 29/06027 370/352 |
| 2006/0239257 A1* | 10/2006 | Banner ............. H04L 29/06027 370/356 |
| 2007/0180485 A1* | 8/2007 | Dua ................. H04L 29/06027 725/114 |
| 2007/0192474 A1 | 8/2007 | Decasper et al. |
| 2009/0298521 A1* | 12/2009 | Finlayson ............. H04L 12/185 455/500 |
| 2011/0028130 A1* | 2/2011 | Swaminathan ... H04M 3/42195 455/414.1 |

OTHER PUBLICATIONS

Supplementary European Search Report dated Apr. 8, 2009.
Tadault, et al., "Network Evolution Towards IP Multimedia Subsystem, "Alcatel Telecommunications Review, 4th Quarter 2003/1St Quarter 2004, pp. 1-9.
International Search Report Issued in PCT/KR2006/002546 dated Oct. 16, 2006.
European Office Action Dated Oct. 4, 2017, issued in Corresponding European Application No. 06 769 115.4, total of 4 pages.

* cited by examiner

SYSTEM AND METHOD FOR DATA TRANSFER BETWEEN TERMINALS IN VOICE COMMUNICATION UNDER VOICE OVER INTERNET PROTOCOL (VOIP)

CROSS-REFERENCE TO RELATED APPLICATIONS

This application is a continuation of application Ser. No. 12/040,844, filed Feb. 29, 2008, which is a continuation application of International Application No. PCT/KR2006/002546, filed Jun. 30, 2006 designating the United States. International Application No. PCT/KR2006/002546 was published in English as WO 2007/026997 A1 on Mar. 8, 2007. This application further claims the benefit of the earlier filing date of Korean Patent Application No. 10-2005-0079920 filed Aug. 30, 2005.

BACKGROUND

Field

The present disclosure relates to a system and method for coordinating data transfer between telecommunication devices.

Discussion of the Related Technology

As the Internet use has become popular, the VoIP (Voice over Internet Protocol) technology for transmitting audible signals through the Internet has been researched and implemented. The VoIP technology provides a speech call service similar to the general telephone network call service by converting speech data into data packets based on the IP network including Internet Protocol based networks or Internet network.

The trends of current communication market are to unify speech, data, and video based on the IP (Internet Protocol). With consideration of those trends, VoIP technology is highlighted among others due to monetary savings through efficient usage of existing network resources and easy management through combination of telephone and data networks. Furthermore, landline communication service providers reinforce developments of IP telephone market services as the Ministry of Information and Communication in Korea has decided to provide the IP calling telephone service to the residents.

Also, the developments in the mobile communications industry and diversification of mobile phone functions have contributed to landline telephone service providers to start developing additional non-speech services. Having additional features to the landline telephone services are crucial, considering the situation in which the usage rate of landline telephones is substantially reduced because of the saturation of the market and increase of mobile phone subscribers. Particularly, on the side of landline communication service providers, availability of additional services other than the existing speech calling feature works as a factor for acquiring subscribers since the telephone number portability is available. A lot of related services have been provided to the users after the landline telephone service providers, desiring to maximize their income, have reinforced intelligence network parts and provided various additional services using intelligence services such as a collect call and a lifetime telephone number.

In the mobile communications industry, data services such as multimedia messaging service (MMS), video on demand (VOD), and game service are provided in addition to the original main calling function according to the mobile communication techniques and terminal performance.

Accordingly, in the landline networks, the user can receive various contents through the IP network by using the VoIP technique. That is, the user can receive various multimedia contents such as documents, web pages, and web catalogs as well as the concurrent speech calling by applying the VoIP technique. This differs from the method in which a single channel for speech call between callers was realized through the channel in the public switched telephone network (PSTN) using the conventional time division multiplexing (TDM) or another network using the code division multiplexing (CDMA). In addition, a video calling service for the callers to make a call viewing each other's face through a predetermined image channel in synchronization with a speech channel is already provided.

The speech calling is available through a cable messenger connected by using a computer. The user can share a picture board, various applications, and games on the computer-based messenger in the peer-to-peer method during a voice calling service.

In the case of providing a share function on the computerized messenger, the user can use the share function after turning on the computer, access a cable messenger server, and log in to the system. Also, it is needed in this case to define a plurality of data sessions in order to share data between many users according to the peer-to-peer method. Further, it is difficult to guarantee the QoS (Quality of Service) for the speech and data traffic since no session control is performed between terminals'. It is not easy to share the data by the terminals even though the data are to be shared between the terminals by considering the shared data type and performance and screen size of the terminals of users who share the data.

The foregoing discussion is to provide background information of the invention and does not constitute an admission of prior art.

SUMMARY

One aspect of the invention is to provide a method for coordinating data transfer between VoIP communication terminals. The method may comprise: arranging, by a telecommunication service, a VoIP session for a voice communication between a first communication terminal and a second communication terminal; receiving, by the telecommunication service, a data transfer request from at least one of the first and second communication terminals; and coordinating, by the telecommunication service, to establish a data session for a data transfer between the first and second communication terminals, wherein coordinating uses at least part of information used in coordinating the VoIP session.

In the foregoing method, receiving the data transfer request may be during the VoIP session. Arranging the VoIP session may comprise receiving, by the telecommunication service, an IP address of at least one of the first and second communication terminals. Arranging the VoIP session may comprise receiving, by the telecommunication service, a URI of at least one of the first and second communication terminals. Arranging may further comprise receiving, by the telecommunication service, a VoIP call request from at least one of the first and second communication terminals, wherein the VoIP call request may be a two-party voice calling request or a three or more party voice calling request. For the data session the telecommunication service may form a communication link between the first and second communication terminals. The method may further comprise converting, by the telecommunication service, a format of the data in view of characteristics of at least one of the first and second communication terminals.

Another aspect of the invention provides a telecommunication service system for coordinating data transfer between VoIP communication terminals. The system comprises: a VoIP session coordinator configured to coordinate a VoIP session for a voice communication between a first communication terminal and a second communication terminal; and a data session coordinator configured to coordinate a data session for a data transfer between the first and second communication terminals, wherein the data session coordinate is configured to establish the data session in response to a data transfer request from at least one of the first and second communication terminals.

The foregoing system may further comprise an authentication module may be configured to authenticate at least one of the first and second communication terminals for either or both of the VoIP session and the data session. The system may further comprise a data converter configured to convert a data format in view of characteristics of the at least one of the first and second communication terminals. The VoIP session coordinator may be configured to use a real-time transport protocol using a session description protocol based on a session initiation protocol. The data session coordinator may be configured to use TCP.

A further aspect of the invention provides a method for data transfer between communication terminals. The method comprises: participating in a voice communication, by a first communication terminal, with a second communication terminal during a VoIP session; receiving, by the first communication terminal, a data transfer request from the second communication terminal; and transferring, by the first communication terminal, data to the second communication terminal during a data session established using at least part of information used in establishing the VoIP session.

In the foregoing method, the VoIP session may be established using a session initiation protocol. The data session may be established subsequent to receiving the data transfer request. The first communication terminal may be selected from the group consisting of a desktop computer, a notebook computer, a mobile phone, a PDA, a smart phone, and a game device. The method may further comprise converting a format of the data in view of characteristics of the second communication terminal. The method may further comprise establishing the VoIP session for the voice communication, wherein establishing the VoIP session comprising sending an IP address of the first communication terminal. Establishing may further comprise sending a URI from the first communication terminal, and wherein establishing further may comprise sending a VoIP call request. The VoIP call request may be a two-party voice calling request or a three or more party voice calling request.

In one aspect of the present disclosure, a contents sharing system for providing voice calling and additional services when a voice call session is established between first and second terminals includes: a) a soft switch for establishing and canceling sessions with the VoIP terminals and processing the voice and contents calls; and b) a contents share server for receiving contents sharing request calls in cooperation with the soft switch, establishing data session for contents sharing between the VoIP terminals in the voice calling session, transmitting control signals on contents traffic and contents sharing in the data session, determining a contents sharing method between the VoIP terminals, and sharing the contents.

In another aspect of the present disclosure, a contents sharing method for providing voice calling and additional services when a voice call session is established between first and second VoIP based terminals includes: a) receiving voice calls from the VoIP call sending terminal, and establishing voice call sessions to the call receiving terminal by using a session initiation protocol; b) receiving a contents sharing request call from the VoIP call sending terminal; and c) establishing a data session for contents sharing between the VoIP terminals having participated in the voice calling by using information used for the voice call session of the VoIP call sending and receiving terminals.

DETAILED DESCRIPTION OF EMBODIMENTS

Figure 1:
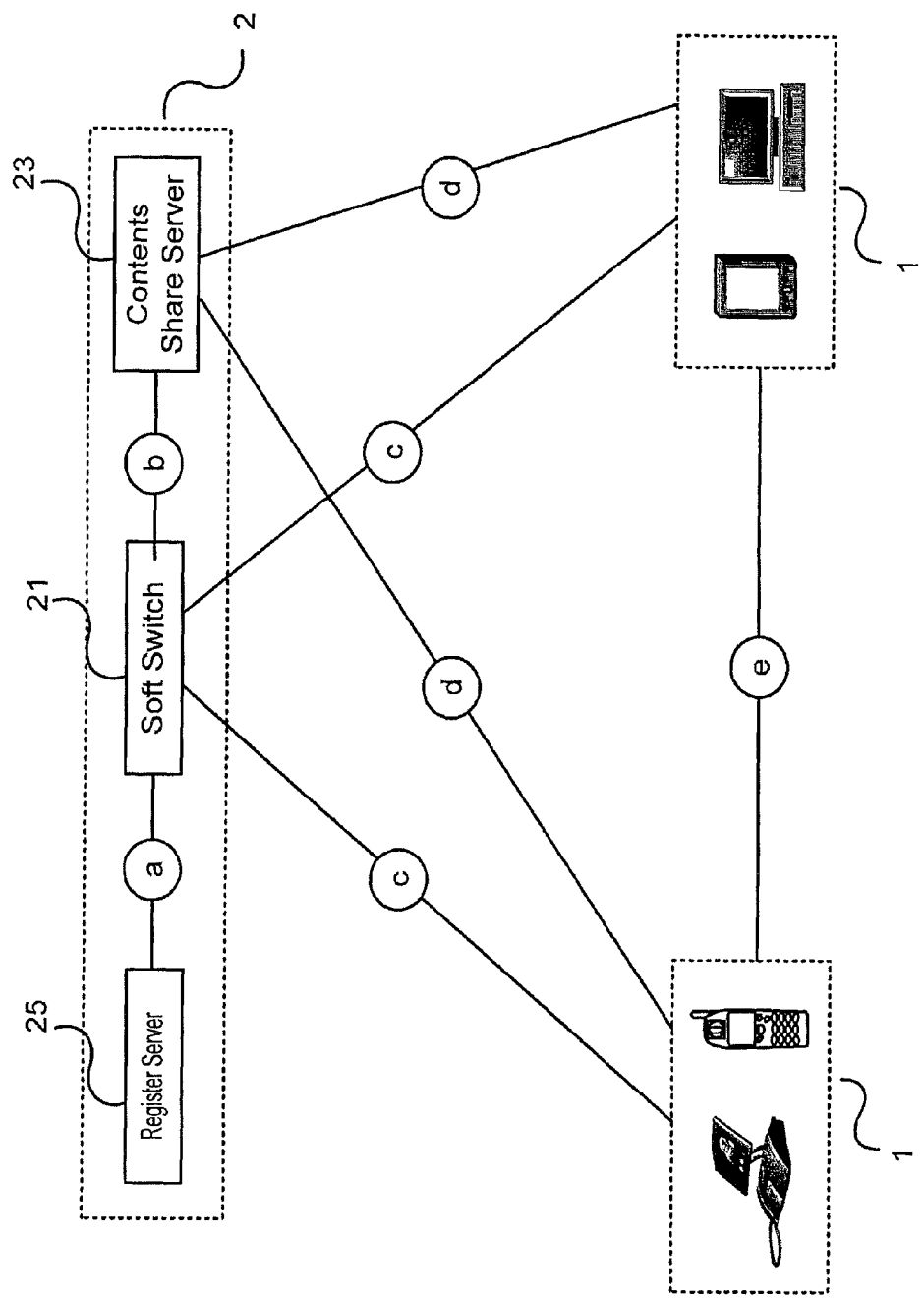
FIG. 1 shows a configuration diagram for a contents sharing system according to an embodiment of the present invention.

Various features and embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. To clarify the embodiment of the present invention in the drawings, parts that are not related to descriptions are omitted, and the same parts over the specification have been assigned the same reference numerals.

Also, the term of module described in the specification represents a unit for processing a predetermined function or operation, and the module can be realized by combining devices, software programs, or devices and programs.

A VoIP based contents sharing system according to an embodiment of the present invention and a method for realizing the system will now be described with reference to drawings.

FIG. 1 shows a schematic diagram for a contents sharing system according to an embodiment of the present invention in the case of a one-to-one call.

As shown, the contents sharing system 2 includes a soft switch 21 and a contents share server 23. In this instance, the contents sharing system 2 may include a register server 25 for registering and authenticating a subscriber of the VoIP terminal 1.

The notations of (a), (b), (c), (d) and (e) in FIG. 1 indicate connections of the respective elements, and the (a), (b) and (c) are based on the session initiation protocol (SIP). Notation (d) is based on the transmission control protocol (TCP). Notation (e) is based on the real-time transport protocol (RTP).

The soft switch 21 processes voice calls and calls related to contents sharing received from VoIP terminal 1. In turn, the soft switch 21 sets and cancels sessions. In this instance, the session of voice call based on the SIP is set by using the session description protocol (SDP), and the voice call between the callers is performed by the RTP. Also, on receiving a call for requesting contents sharing, the soft switch 21 uses information used in the voice call session based on the SIP and requests contents sharing between callers from the contents server 23. The information used in the said voice call includes the subscriber's subscriber uniform resource identifier (URI), an IP address, and a subscriber profile.

The contents share server 23 receives the call for requesting contents sharing from the soft switch 21 and sets a data session for contents sharing between the callers. The data session is set by the TCP, and control signals and contents traffic are transmitted in the TCP format. In this instance, the contents traffic can be shared with the other calling terminal through the contents share server, or the same can be directly shared between the terminals. In addition, when the contents share server 23 loads the contents stored in the terminal or another server and receives the contents, the contents share server 23 can share data by providing loading information (a contents loading path) to the calling terminal. Also, the contents share server 23 generates and transmits a signal for controlling contents sharing between the VoIP terminals. That is, for example, when a first terminal from among the terminals currently sharing contents desires to share predetermined contents with a second terminal, the second terminal generates and transmits a signal for controlling the first terminal. The contents share server 23 determines location information of the contents to be shared by the callers and a sharing method from among the uni-casting method and multi-casting method according to the contents file type, and performs a function for sharing contents between the callers. In further detail, the contents share function transmits a control signal for providing a transparent picture board or a white board on the contents shared by the callers and a signal for indicating lines, points, boxes, and circles on the transparent picture board or the white board.

Also, since the register server 25 transmits and receives an SIP based message, the VoIP terminal 1 maps the URI used for setting a call and an IP address provided on the actual IP network and newly maps a second IP address and the URI when the second IP address is changed to and, thus, register a subscriber. In this instance, information on the VoIP terminal 1 is concurrently transmitted to authenticate the subscriber, and a register process is performed on the subscriber-authenticated terminal 1.

Figure 2:
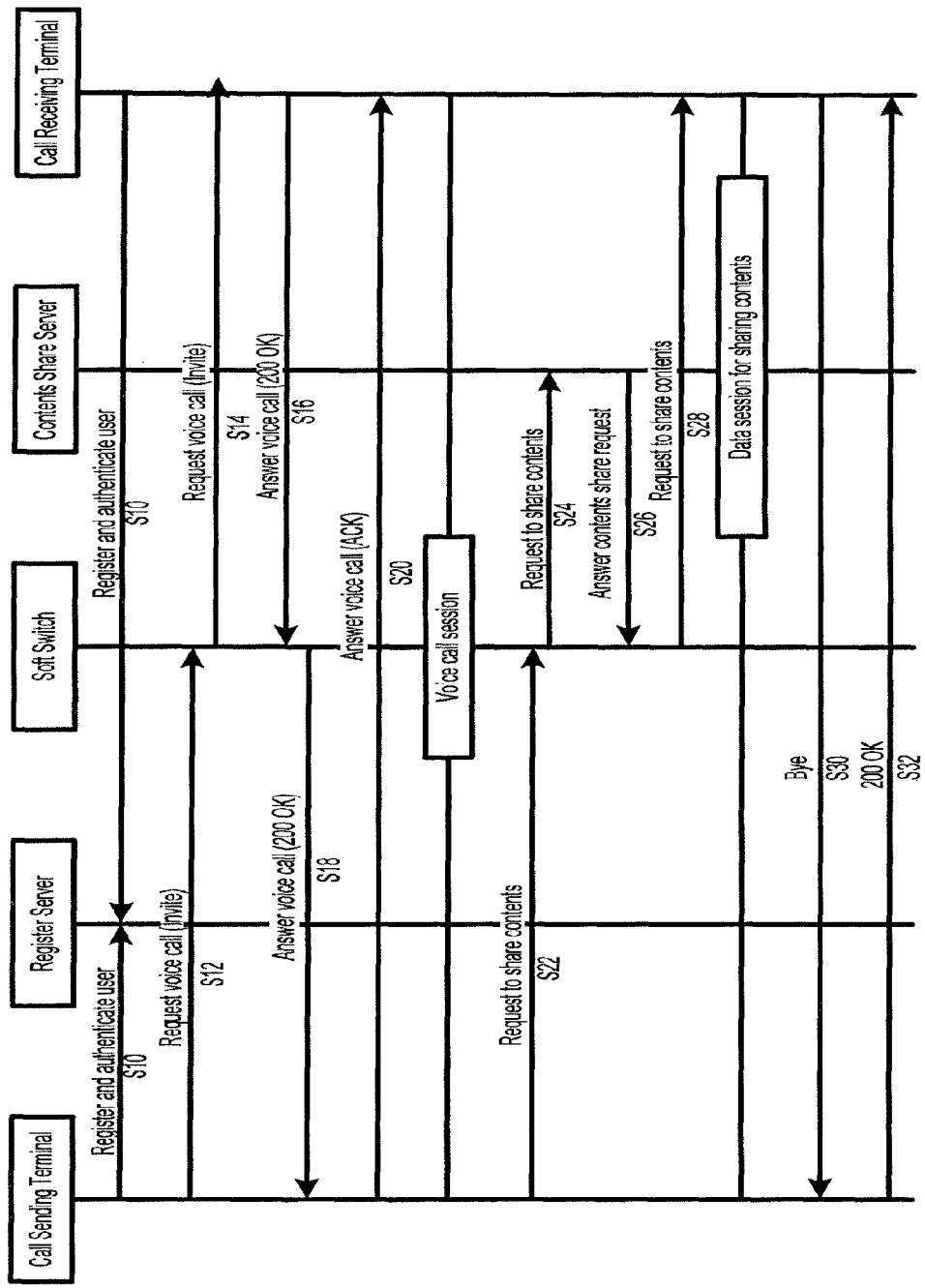
FIG. 2 shows a flowchart for a contents sharing method according to an embodiment of the present invention.

FIG. 2 shows a flowchart for a VoIP based contents sharing method according to an embodiment of the present invention in the case of a one-to-one calling.

As shown, the soft switch receives a message (invite) for requesting a voice call from a calling terminal having undergone the register and authentication process of S10 (S12). The soft switch extracts call receiving user information (telephone number) from the message (invite) to determine the call receiving user, and transmits the message (invite) to the call receiving terminal (S14). The call receiving user terminal transmits a response message (200 OK) in response to the invite message to the soft switch (S16). The soft switch transmits the response message (200 OK) to the call sending user terminal (S18). The call sending user terminal transmits a response message (ACK) to the received response message (200 OK) to the call receiving user terminal (S20). In this instance, a voice call session is set between the call sending user terminal and the call receiving user terminal. The voice call session is performed by the SDP based on the SIP, and the voice calling is transmitted in the RTP format.

When the voice calling session is set, a contents sharing request may be generated between the call sending user terminal and the call receiving user terminal.

When contents sharing is requested, the soft switch receives a contents sharing request call from the call sending user terminal (S22). The soft switch transmits information (the URI, IP address, and subscriber profile) on the call sending user and the call receiving user used in the voice call session to the contents share server by applying the information to the contents sharing request call message and receives a corresponding response message from the contents share server (S24, S26). The contents share server transmits a message for setting a data session for contents sharing to the soft switch and the call receiving user terminal (S28). In this instance, a data session for contents sharing is established between the call sending user terminal and the call receiving user terminal. And the data session is set by the TCP, through which various contents are shared between the callers.

Cancellation of the data session for contents sharing is performed through a Bye message and a 200 OK message between the call sending user terminal and the call receiving user terminal (S30, S32).

The process for generating the data session for contents sharing between the soft switch, the contents share server, the call sending terminal, and the call receiving terminal is performed by exchanging an SIP based message.

Figure 3:
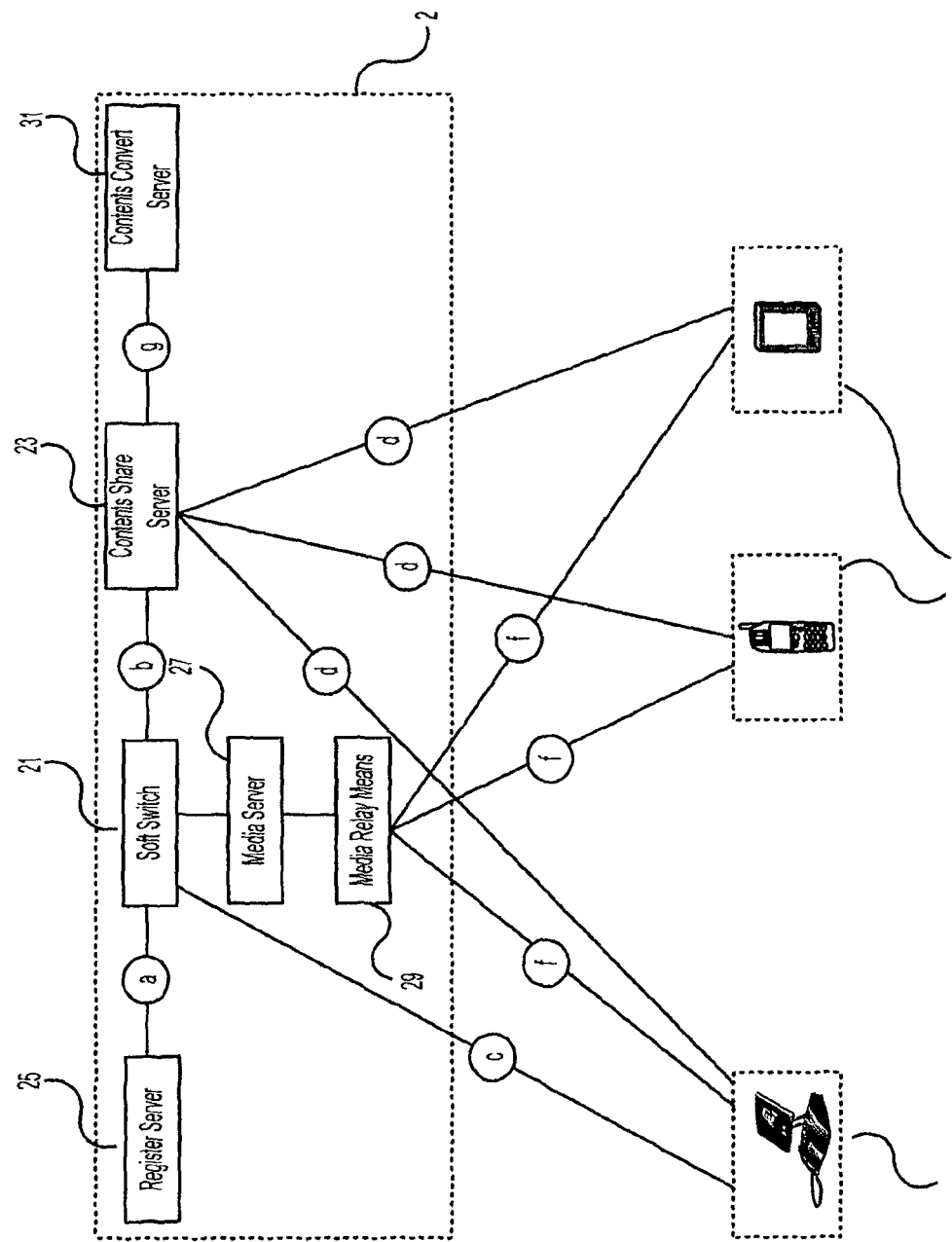
FIG. 3 shows a configuration diagram for a contents sharing system when a one-to-one call or a one-to-N user call is generated and contents are converted according to an embodiment of the present invention.

FIG. 3 shows a VoIP voice call based contents sharing system according to an embodiment of the present invention when a call between a user and two or more users is generated and contents are converted.

The (a), (b), (c) and (d) in the drawing correspond to those shown in FIG. 1, and (f) indicates a connection state between a plurality of calling terminals and a media relay means based on the RTP. Notation (g) indicates a connection state between the contents share server and the contents convert server based on the TOP.

As shown in FIG. 3, the contents sharing system 2 processes the case of call between many users or the case of contents conversion between terminals of different types based on the configuration of the contents sharing system 2 as shown in FIG. 1. And it further includes a media server 27, a media relay means 29, and a contents convert server 31.

On receiving a multi-user call from the soft switch 21, the media server 27 sets a voice call session between the VoIP terminals 1 for the multi-user call and controls operations on the multi-user call.

The media relay means 29 connects or combines the voice call channel between the VoIP terminals 1 in a relay manner under the control by the media server 27. That is, the multi-user call is performed by establishing a voice call channel between the VoIP terminals 1 with reference to the media relay means 29.

The contents sharing system 2 may further include a contents convert server 31. The contents convert server 31 converts contents by considering terminal performances based on the contents share server and the established TCP session. That is, the contents convert server 31 converts the contents since media codecs, screen sizes, and performance between the terminals 1 to be shared are different and the file size for the respective contents to be shared are different.

Also, in the case of multi-user sharing, since a load may be given to the terminal because of receiving a large volume of contents files when attempting to share contents from a plurality of VoIP terminals 1, the contents convert server 31 converts the contents (e.g., compresses the contents files) so as to prevent the generation of load. That is, when the contents files supported by the calling terminals are different or the screen sizes are different, the contents convert server 31 converts the contents to satisfy the differences. The contents convert server 31 can be included in the multi-user calling or the contents sharing system supporting the one-to-one calling shown in FIG. 1.

Figure 4:
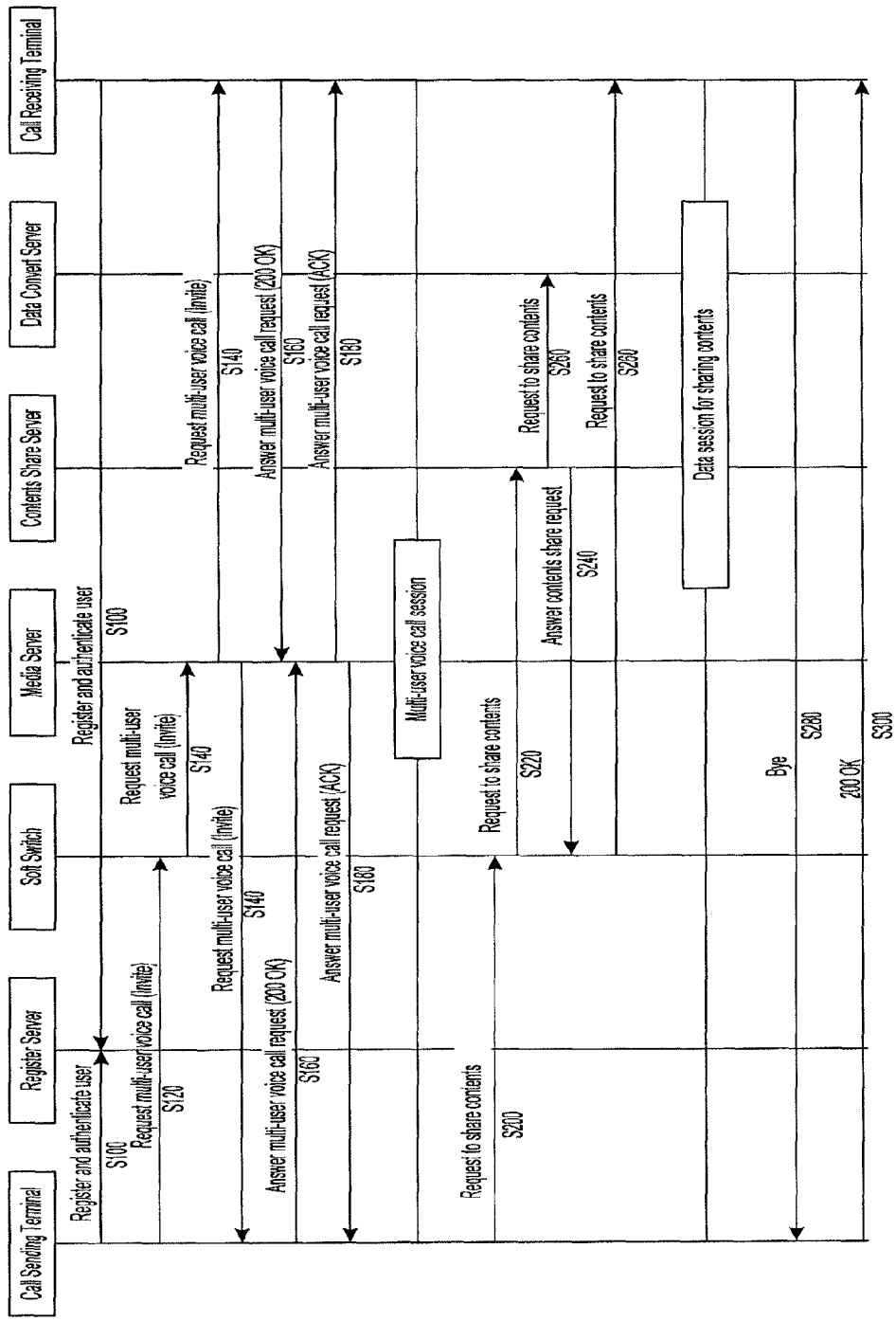
FIG. 4 shows a flowchart for a contents sharing method when a one-to-one call or a one-to-N user call is generated and contents are converted according to an embodiment of the present invention.

FIG. 4 shows a flowchart for a VoIP voice call based contents sharing method according to an embodiment of the present invention when a one-to-N user calling is generated and contents are converted.

As shown, as to the VoIP terminals having undergone the register and authentication process (S100), the soft switch receives a multi-user call request message (invite) from the call sending user terminal (S120). The soft switch transmits the same message (invite) to the media server (S140). The media server transmits the message (invite) to the contents share server and the terminals (a call sending user terminal and a call receiving user terminal) that will perform a multi-user calling (S140). A multi-user session is established through the processes (S160, S180) for transmitting and receiving the 200 OK and ACK messages between the media server and the terminals media server for performing a multi-user calling.

The soft switch receives a contents sharing request message from the call sending user terminal (S200). The soft switch transmits the received message to the contents share server (S220). In this instance, the message is to request contents sharing by using multi-user caller information (URI, IP address, and subscriber profile) used for the multi-user calling session. The contents share server transmits a response message to the message received from the soft switch to the soft switch (S240). Since the contents convert server receives the contents request message from the contents share server (S260), the contents convert server joins the data session for contents sharing, and converts subsequent shared contents into contents that satisfy other terminals' characteristics or compresses large contents into smaller ones.

The contents share server transmits the contents share request message transmitted to the soft switch and the contents convert server to the terminals in the multi-user calling (S260). Hence, a data session for contents sharing is established between the terminals having participated in the multi-user calling. Cancellation of the data session is performed by transmitting the Bye and 200 OK messages (S280, S300) between the terminals having participated in the multi-user calling in a like manner shown in FIG. 2.

In the contents sharing system described with reference to FIG. 1 to FIG. 4, the callers during a voice call can share various contents including general documents, web pages, web catalogs, characters, chat messages, image files, motion pictures, and media files. Also, the callers can simultaneously view the screens on which the contents are displayed, and they can share the operations such as turning to other pages of the shared contents by any one of the callers, drawing pictures, or describing comments on the page in which the contents are displayed.

Further, the contents sharing system allows traffic control of contents sharing between the callers with reference to the contents share server and, thus, provide a terminal-to-terminal QoS (Quality of Service).

The above-described embodiment of the present invention is realized not only by the method and apparatus but also by programs for realizing functions that correspond to the components of the embodiment of the present invention and recording media having recorded the programs, which is well known to a person skilled in the art.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

Accordingly, the users can share various contents in addition to the voice call function to overcome the problem in which they failed to sufficiently communicate with each other in the voice only call.

Also, since the users are voice connected while sharing the contents on the VoIP terminals they can get counseling, do shopping while viewing a web catalog online, order desired goods while an order issuer and an order receiver view the menu displayed on the screen, and perform business such as a case for sharing contents in the audio and video manners in the multi-user calling to conduct conference or educational meetings.

The invention claimed is:

1. A telecommunication service system for coordinating data transfer between VoIP communication terminals, the system comprising:

a media server, which is a first session coordinator, configured to coordinate a VoIP session for a voice communication between a first communication terminal and one or more other communication terminal;

a content share server, which is a second session coordinator, configured to coordinate a data session for a data transfer between the first and the one or more other communication terminals in response to a data transfer request from at least one of the first and the other communication terminals;

a soft switch, which is a processor and which receives a first message requesting the VoIP session for the voice communication from the first communication terminal, which transmits a response message to the other communication terminals, extracts information of the first communication terminal from the message, transmits a second message to the other communication terminals, receives a response message from the other communication terminals, and sets up the VoIP session, which is performed by a session description protocol based on a session initiation protocol and transmits the voice communication in an real-time transport protocol format; and a data converter server configured to convert a data format in view of characteristics of the at least one of the first and the other communication terminals, wherein the data transfer request is received during the VoIP session, wherein the telecommunication service system determines location information of data to be shared between the first and second communication terminals and determines a sharing method which is selected from among a uni-casting method and a multi-casting method according to a contents file type, wherein the contents file type corresponds to at least one contents type from among general documents, web pages, web catalogs, characters, chat messages, image files, motion pictures, and media files, wherein coordinating the data session for the data transfer comprises using at least one from among a URI, an IP address, and a subscriber profile which used in establishing the VoIP session for the voice communication between the first and the other communication terminals, wherein the second session coordinator is separate from the first communication terminal.

2. The system of claim 1, further comprising a media server configured to set the VoIP session for the voice communication between multiple communication terminals and control operation on a multi-user VoIP call.

3. A method for sharing data with a second communication terminal in a first communication terminal, sending a data transfer request using a telecommunication service during a VoIP session for a voice communication between the first communication terminal and the second communication terminal, maintaining a data session for a data transfer with the second communication terminal when the data session is established by a contents share server, wherein the contents share server determines location information of data to be shared between the first and second communication terminals and determines a sharing method which is selected from among a uni-casting method and a multi-casting method according to a contents file type, and sharing the data with the second communication terminal according to the location information of data and the sharing method determined by the contents share server, wherein coordinating the data session for data transfer comprises using at least one from among a URI, an IP address, and a subscriber profile which used in establishing the VoIP session for the voice communication between the first and second communication terminals, wherein a format of the data to be shared is converted by a data converter server in view of characteristics of the at least one of the first and second communication terminals by the telecommunication service, wherein the contents share server is separate from the first communication terminal, wherein the contents file type corresponds to at least one contents type from among general documents, web pages, web catalogs, characters, chat messages, image files, motion pictures, and media files, and wherein a soft switch, which is a processor, receives a first message requesting the VoIP session for the voice communication from the first communication terminal, which transmits a response message to the second communication terminals, extracts information of the first communication terminal from the message, transmits a second message to the second communication terminals, receives a response message from the second communication terminals, and sets up the VoIP session, which is performed by a session description protocol (SDP) based on a session initiation protocol (SIP) and transmits the voice communication in an real-time transport protocol (RTP) format.

* * * * *